United States Patent
Imamura et al.

(10) Patent No.: US 6,936,375 B2
(45) Date of Patent: Aug. 30, 2005

(54) BATTERY UNIT FOR LENS-FITTED PHOTO FILM UNIT

(75) Inventors: Takashi Imamura, Kanagawa (JP); Nobuyuki Kameyama, Kanagawa (JP)

(73) Assignee: Fuji Photo Film, Co., Ltd., Kanagawa (JP)

( * ) Notice: Subject to any disclaimer, the term of this patent is extended or adjusted under 35 U.S.C. 154(b) by 522 days.

(21) Appl. No.: 09/973,841

(22) Filed: Oct. 11, 2001

(65) Prior Publication Data
US 2002/0045093 A1 Apr. 18, 2002

(30) Foreign Application Priority Data

Oct. 12, 2000 (JP) .......................................... 2000-312513
May 15, 2001 (JP) .......................................... 2001-145386

(51) Int. Cl.⁷ .............................................. H01M 2/10
(52) U.S. Cl. ................................... 429/96; 429/100
(58) Field of Search .................... 429/90, 96, 97, 429/100

(56) References Cited

U.S. PATENT DOCUMENTS

| 2,982,807 | A | | 5/1961 | Dassow |
| 3,650,841 | A | | 3/1972 | Brindley |
| 3,941,618 | A | * | 3/1976 | Mabuchi ..................... 429/99 |
| 4,081,397 | A | | 3/1978 | Booe ......................... 252/194 |
| 4,788,112 | A | | 11/1988 | Kung .......................... 429/54 |
| 5,404,281 | A | | 4/1995 | Parker ........................ 362/208 |
| 5,663,699 | A | | 9/1997 | Shiroyama .................. 335/126 |
| 5,766,038 | A | | 6/1998 | Sugie .......................... 439/587 |
| 5,904,414 | A | | 5/1999 | Monteleone et al. ........ 362/205 |
| 6,106,969 | A | * | 8/2000 | Lian et al. .................... 429/90 |
| 6,228,517 | B1 | * | 5/2001 | Chih-Chang et al. ..... 429/96 X |

FOREIGN PATENT DOCUMENTS

| DE | 200 05 546 | * | 6/2000 | ............ H01M/2/10 |
| EP | 0 949 706 | | 10/1999 | |
| GB | 2 164 200 A | | 3/1986 | ............ H01M/5/50 |
| GB | 2 325 333 | | 11/1998 | |
| GB | 2 360 396 A | | 9/2001 | ............ H01M/2/10 |
| JP | 10-69893 | * | 3/1998 | ............ H01M/2/10 |
| JP | 11-271933 | | 8/1999 | ............ H01M/2/10 |

* cited by examiner

*Primary Examiner*—Stephen J. Kalafut
(74) *Attorney, Agent, or Firm*—Young & Thompson (57) ABSTRACT

A lens-fitted photo film unit contains a battery unit. The battery unit has a battery, which includes positive and negative battery electrodes. A battery case is formed from insulating material, and contains the battery. An elastic cap is included in the battery case. First and second contact segments are thrust through respectively the elastic cap in a watertight manner, and contact respectively the positive and negative battery electrodes, for external connection of the battery.

28 Claims, 12 Drawing Sheets

BATTERY UNIT FOR LENS-FITTED PHOTO FILM UNIT

BACKGROUND OF THE INVENTION

1. Field of the Invention

The present invention relates to a battery unit for lens-fitted photo film unit. More particularly, the present invention relates to a battery unit for lens-fitted photo film unit in which a battery is contained for powering a flash device, and can be enclosed in a reliably watertight manner even by a simple structure.

2. Description Related to the Prior Art

A lens-fitted photo film unit as a single-use camera pre-loaded with photo film. After a user takes photographs by use of the lens-fitted photo film unit, he or she does not remove photo film, but can forward the lens-fitted photo film unit simply to a photofinisher to ask for printing photographs. Because of good availability and great ease in handling, the lens-fitted photo film unit is widely used today.

There is a flash built-in type of the lens-fitted photo film unit useful in taking photographs at night, indoors, with a rear light and the like. In general, the lens-fitted photo film unit includes a main body and an exposure unit in front of the main body. For emission of flash light, a flash device has a circuit board, which is disposed in a space between the exposure unit and a roll holder chamber formed in the main body. A battery is used as power source for the flash device. An example of the battery is an alkali battery of the AA type. The battery is oriented to lie horizontally in the longitudinal direction of the main body. At least one battery electrode of the battery is located farther from the circuit board. A contact segment of the circuit board for contact with the battery electrode is constituted by an arm portion, which has a considerable length near to that of the battery, for example approximately 40 mm. The battery is held with the circuit board by squeezing of the contact segment.

For a user to use the lens-fitted photo film unit in an underwater scene, there is a waterproof type of the lens-fitted photo film unit available commercially. A waterproof case is used to accommodate the lens-fitted photo film unit. The waterproof type also includes the flash device and the battery. In the known type, it is likely that the waterproof case is broken if the lens-fitted photo film unit is dropped and shocked considerably. Water may permeate the inner elements of the lens-fitted photo film unit. The battery is likely to corrode, to cause solution leakage of electrolyte. A similar problem may occur in the general-use type without waterproofness. If the lens-fitted photo film unit is used at the time of a rainfall outdoors, the solution leakage may occur in the battery because of entry of water. In considering that the battery is an alkali battery, the electrolyte of a strong alkali is harmful to human bodies, may cause alkali burn to a user's hands, or enter the user's eye.

To solve those problems, there have been various suggestions. JP-A 11-271933 discloses a flash built-in type of the lens-fitted photo film unit in which a battery chamber contain the battery and has a watertight structure. According to this document, the electrolyte does not flow out of the battery chamber even if the solution leakage of the electrolyte occurs from the battery. This is effective in preventing accidents such as burn of hands of a user because of the strong alkali.

The structure of JP-A 11-271933 has a problem in lack of consistency to recycling of parts. It is difficult to reduce a manufacturing cost. The above-mentioned structure with the arm portion for connection with the battery is suitable for recycling, but cannot be combined with the structure in the prior document. There is no structure having both the suitability for recycling and reliable watertightness.

SUMMARY OF THE INVENTION

In view of the foregoing problems, an object of the present invention is to provide a battery unit for lens-fitted photo film unit in which a battery is contained for powering a flash device, and can be enclosed in a reliably watertight manner even by a simple structure.

In order to achieve the above and other objects and advantages of this invention, a battery unit for being contained in a lens-fitted photo film unit is provided. A battery includes first and second battery electrodes. A battery case is formed from insulating material, for containing the battery. First and second through holes are formed in the battery case. First and second contact segments are inserted through respectively the first and second through holes in a watertight manner, for contacting respectively the first and second battery electrodes, for external connection of the battery.

The battery is an AAA type, and the battery case substantially has a size of an AA type of battery.

The battery case is constituted by an elastic member at least partially. The first and second contact segments are thrust through the elastic member in the watertight manner, so as to form the first and second through holes.

Each of the first and second contact segments includes a plate portion for contacting the first or second battery electrode. A terminal pin is formed to protrude from the plate portion, for being thrust through the elastic member in the watertight manner.

The battery is shaped cylindrically, and has first and second end faces and a cylindrical face. The first battery electrode is disposed at the first end face, and the second battery electrode is disposed at the second end face and the cylindrical face.

The battery case includes a case body, having one end wall, and an end opening disposed opposite to the end wall, for containing the battery. The elastic member is a cap for closing the end opening in the watertight manner.

The plate portion of the second contact segment is curved, and has an inner face for contacting the cylindrical face of the battery.

The cap is formed from rubber or elastomer.

The cap includes a projecting portion, formed to project from a cap outer face in a position of the terminal pin of the first or second contact segment. A receiving chamber is formed to retreat from a cap inner face in a position reverse to the projecting portion, for receiving the terminal pin, to allow thrusting of the terminal pin through the projecting portion.

Furthermore, a positioning cutout is formed in the plate portion of the first contact segment. A positioning projection is formed to project from the cap, for engagement with the positioning cutout to position the first contact segment.

Also, a retention groove is formed in one of the cap and the case body. A retention projection is formed to project from a remaining one of the cap and the case body, for engagement with the retention groove, to retain the cap on the case body in the watertight manner.

Furthermore, a containing chamber is formed inside the cap, for containing at least one of neutralizing agent, hydrogenation catalyst and water absorbing agent.

Also, neutralizing agent is accommodated in the battery case, for neutralizing alkali solution from said battery being damaged.

Furthermore, hydrogenation catalyst is accommodated in the battery case, for causing hydrogen from the battery to react upon oxygen if the battery is damaged.

Also, water absorbing agent is accommodated in the battery case, for absorbing water produced according to the hydrogenation catalyst.

Furthermore, a coloring member or coloring material layer includes coloring material, is applied to or secured to an outer surface of the battery case, for developing color by reaction upon alkali solution from the battery being damaged, to indicate occurrence of a damage.

According to another aspect of the invention, at least one biasing mechanism is disposed between the first contact segment and the first battery electrode, or between the second contact segment and the second battery electrode, for pushing the first or second contact segment to keep the first or second contact segment fitted tightly in the first or second through hole.

The battery is shaped cylindrically, and the first and second battery electrodes are disposed at first and second end faces of the battery. The battery case includes a case body and a cap, the case body having one end wall, and an end opening disposed opposite to the end wall, for containing the battery, the cap closing the end opening in the watertight manner. The first and second through holes are formed in respectively the cap and the end wall.

Furthermore, first and second packing members prevent water from entry between the first contact segment and the first through hole, and between the second contact segment and the second through hole.

Each of the first and second contact segments includes a plate portion disposed between an inner face of the cap or the end wall and the first or second battery electrodes. A terminal projection is formed to project from the plate portion, and inserted in the first or second through hole.

The first packing member is disposed between the plate portion of the first contact segment and the cap, and the second packing member is disposed between the plate portion of the second contact segment and the end wall.

The at least one biasing mechanism includes a coil spring.

In another preferred embodiment, the at least one biasing mechanism includes a plate spring.

In a further preferred embodiment, the cap includes a disk-shaped cap body. A flange portion is formed to project from a periphery of the cap body toward the end wall, for being fitted on an outer surface of the case body about the end opening.

In still another preferred embodiment, the cap is inserted in the end opening to be fitted.

By the construction of the present invention, the battery can be enclosed in a reliably watertight manner even by a simple structure, because the first and second contact segments are inserted through respectively the first and second through holes in a watertight manner.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
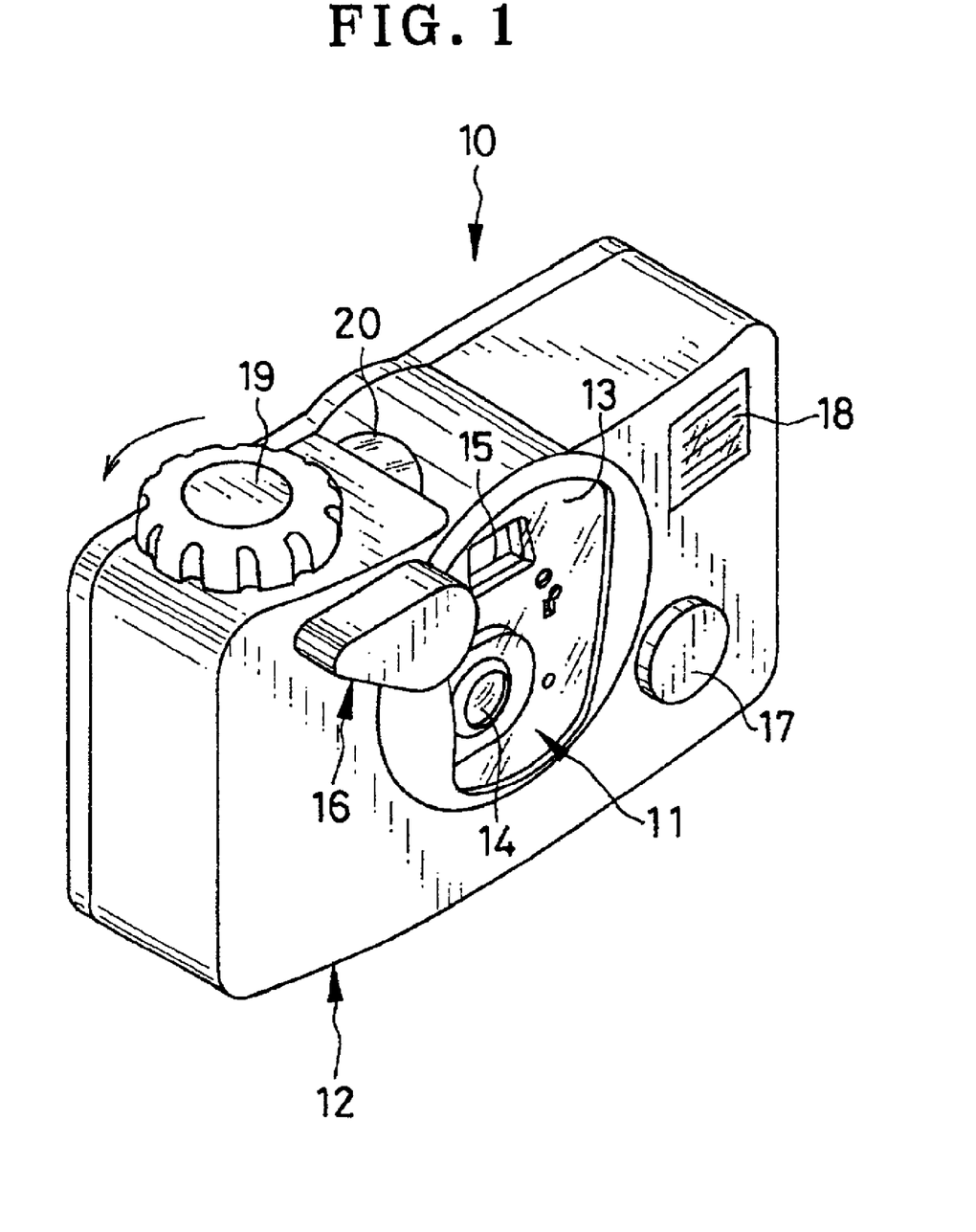
FIG. 1 is a perspective illustrating a waterproof lens-fitted photo film unit.

In FIG. 1, a waterproof lens-fitted photo film unit 10 is illustrated, which includes a lens-fitted photo film unit 11 and a waterproof case 12 for containing the lens-fitted photo film unit 11. A front window 13 is included in a front wall of the waterproof case 12. A taking lens 14 and a viewfinder objective window 15 are incorporated in the lens-fitted photo film unit 11. The front window 13 allows outer light to enter the taking lens 14 and the viewfinder objective window 15.

A shutter release lever 16 is disposed beside the front window 13, and operable for releasing a shutter mechanism. A flash button 17 and a flash window 18 are disposed opposite to the shutter release lever 16. The flash button 17 is depressible for turning on the flash circuit. The flash window 18 is a transparent wall for illumination with flash light to a photographic object.

A winder wheel 19 and an upper window 20 are disposed in an upper side of the waterproof case 12. The winder wheel 19 is rotated for winding the photo film by one frame. The upper window 20 is transparent, and keeps a frame counter window visible to a user.

Figure 2:
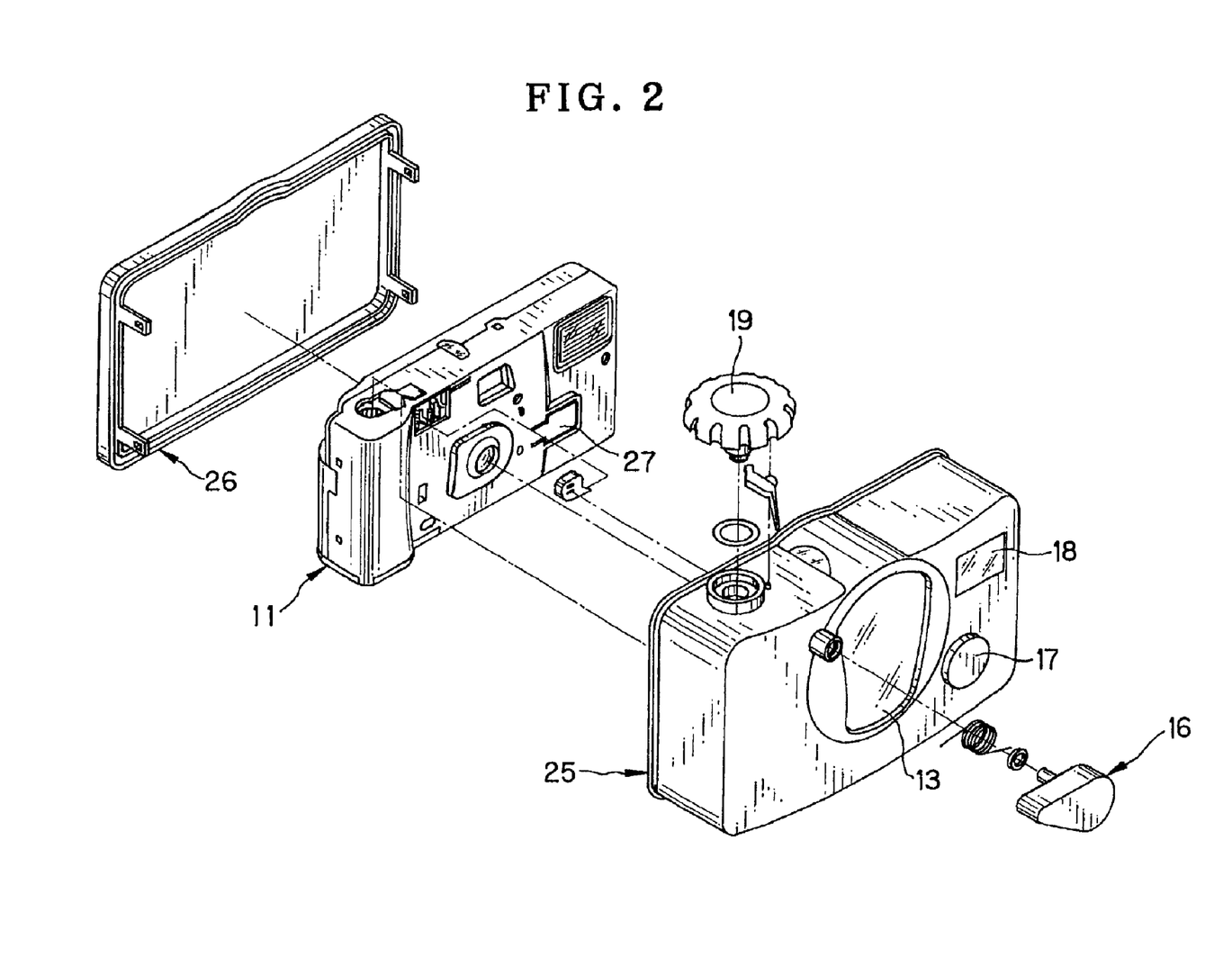
FIG. 2 is an exploded perspective illustrating the waterproof lens-fitted photo film unit.

In FIG. 2, elements of the waterproof lens-fitted photo film unit 10 are illustrated in an exploded perspective. The waterproof case 12 contains the lens-fitted photo film unit 11. The waterproof case 12 includes a case body 25 and a rear lid 26. The case body 25 has an open rear side of a quadrilateral shape, which receives insertion of the lens-fitted photo film unit 11. The rear lid 26 closes the open rear side in a watertight manner. An inner flash button 27 of the lens-fitted photo film unit 11 can be pushed by operating the flash button 17, because the flash button 17 is secured with a member of elastomer flexible with elasticity.

The rear lid 26 is formed from transparent plastic material, and keeps an eyepiece viewfinder window (not shown) usable for observation in the rear side of the lens-fitted photo film unit 11.

Figure 3:
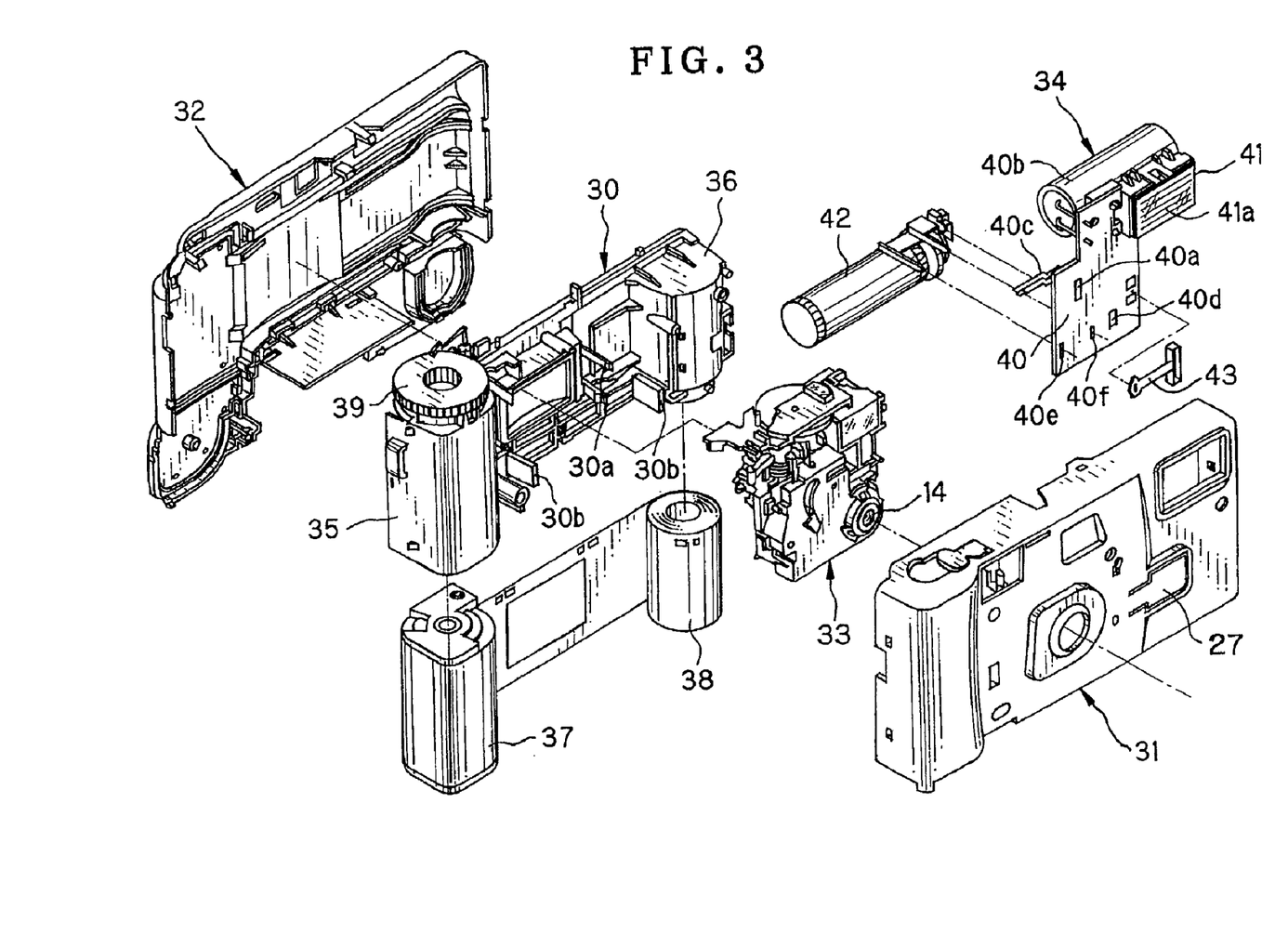
FIG. 3 is an exploded perspective illustrating the lens-fitted photo film unit.

In FIG. 3, the lens-fitted photo film unit 11 is illustrated. The lens-fitted photo film unit 11 includes a main body 30, a front cover 31 and a rear cover 32. An exposure unit 33 and a flash unit 34 are secured to the front of the main body 30. A cassette holder chamber 35 and a roll holder chamber 36 are formed in the main body 30. A cassette 37 is contained in the cassette holder chamber 35. A roll of photo film 38 is contained in the roll holder chamber 36. The exposure unit 33 includes a shutter mechanism, a frame counter mechanism, a photo film retention mechanism and the like, and is secured to the main body 30 removably by engagement of hooks or claws.

A winder wheel 39 is disposed on an upper side of the cassette holder chamber 35. A winding shaft is formed to project down from the winder wheel 39, and engaged with a spool in the cassette 37. At each time after one exposure, the winder wheel 39 is rotated to wind the photo film 38 into the cassette 37 by one frame. The winding operation charges a shutter mechanism in the exposure unit 33 for a succeeding exposure. Upon completion of photo film feeding by one frame, the winder wheel 39 is locked and stopped from rotation.

The flash unit 34 includes a flash circuit board 40, a flash emitter 41, and a battery unit 42. An opening 40a is formed in the flash circuit board 40. A hook or claw 30a is located between the exposure unit 33 and the roll holder chamber 36, and inserted in the opening 40a. Thus the flash circuit board 40 is secured to the main body 30 in a removable manner. Also, the flash circuit board 40 has a printed circuit pattern, to which various electrical elements are connected. The flash emitter 41 above the flash circuit board 40 includes a flash discharge tube, a reflector and a protector/diffuser 41a. The reflector is disposed behind the flash discharge tube. The protector/diffuser 41a is disposed in front of the same. A pair of holder plates 30b are disposed between the cassette holder chamber 35 and the roll holder chamber 36. A distance between the holder plates 30b is slightly shorter than a length of the battery unit 42, which is supported between the holder plates 30b with pressure in a firmly retained state.

A switch segment 43 is secured to the rear of the inner flash button 27 by means of an elastomer member. When the flash button 17 is pushed down, the switch segment 43 comes in contact with the flash circuit board 40 for switching on. The flash circuit is turned on. A main capacitor 40b is charged. Upon actuation of the shutter mechanism, a sync switch 40c is turned on, to discharge the main capacitor 40b. Flash light is emitted by the flash emitter 41.

Figure 4:
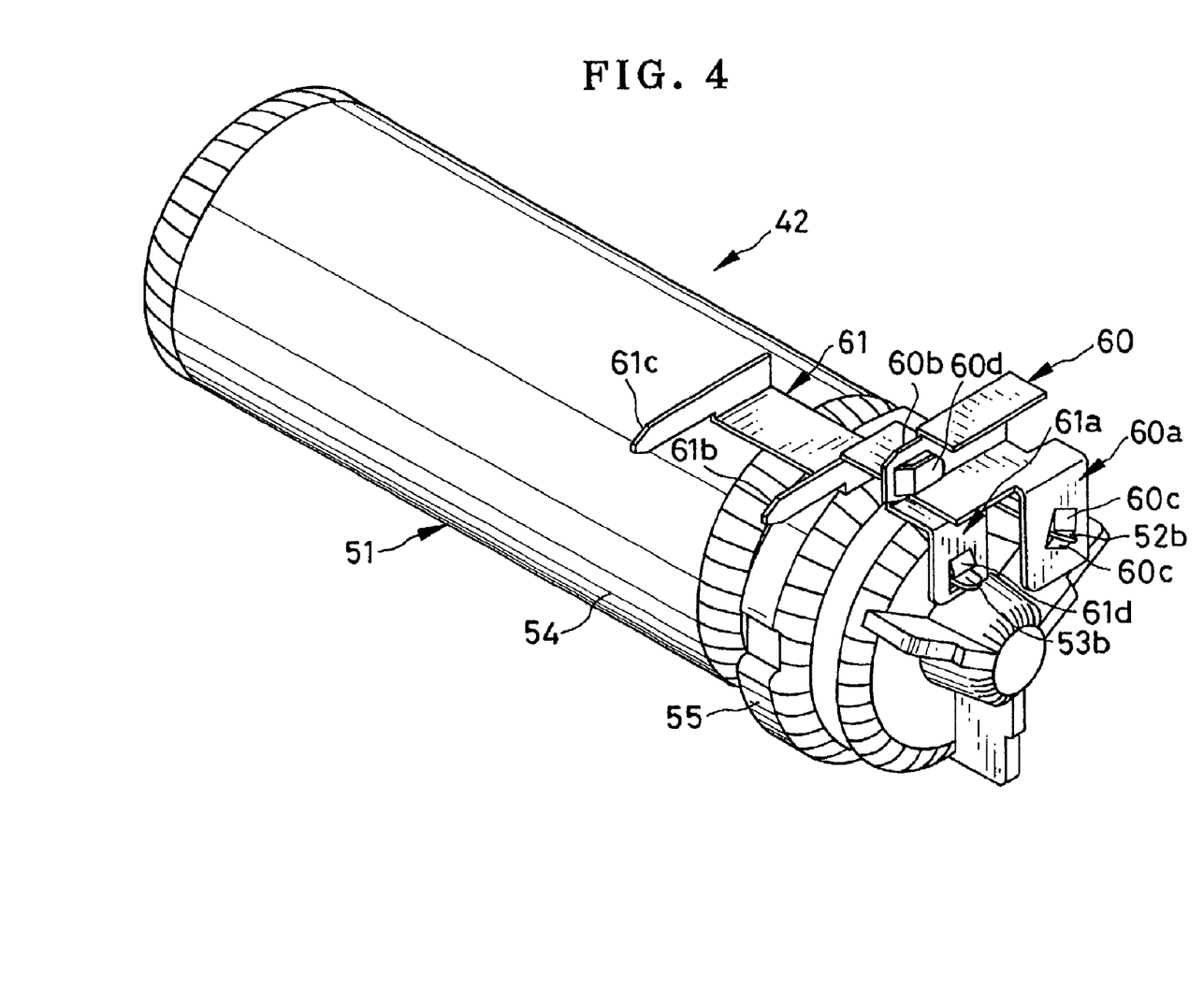
FIG. 4 is a perspective illustrating a battery unit.
Figure 5:
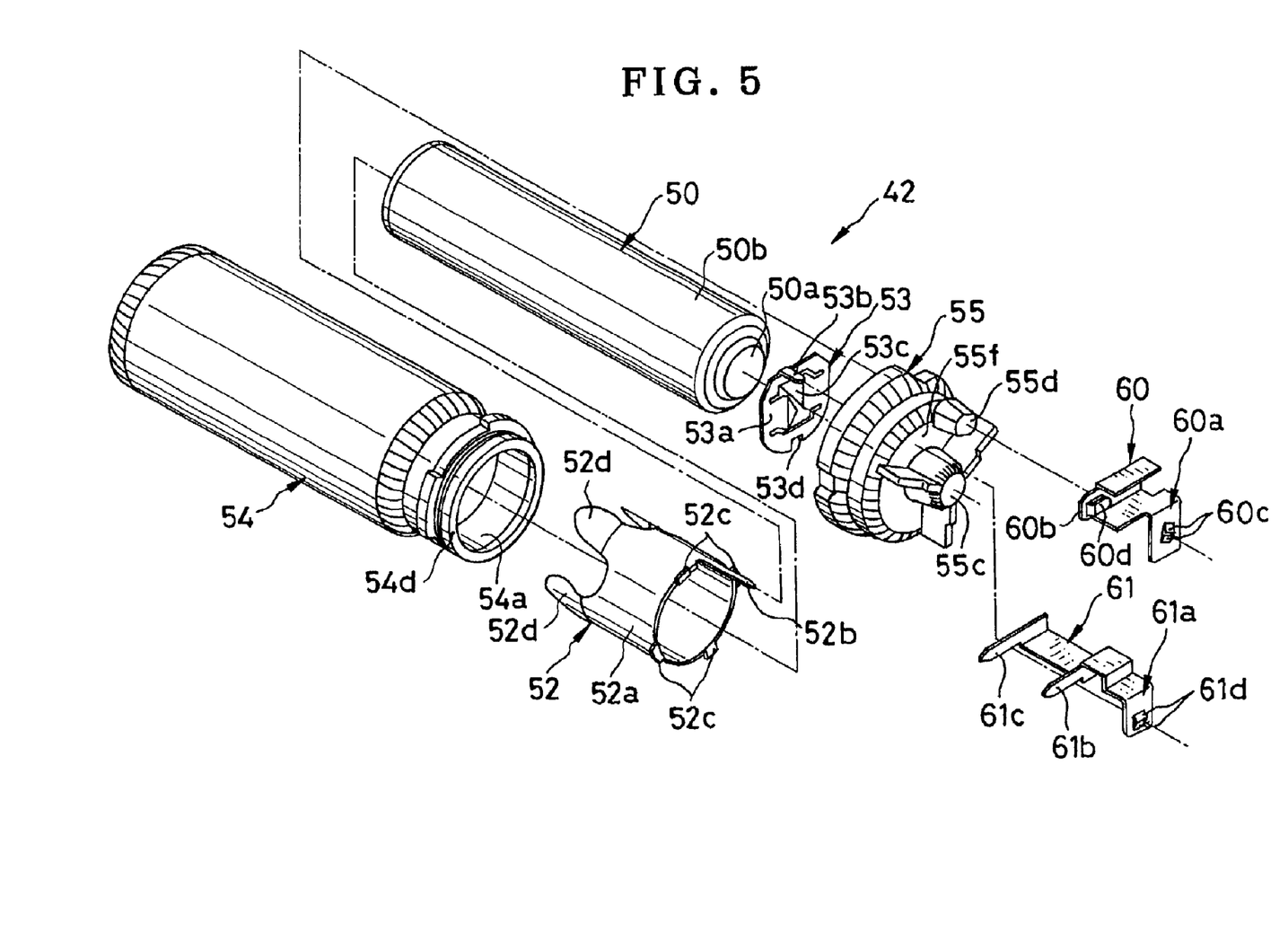
FIG. 5 is an exploded perspective illustrating the battery unit.

In FIGS. 4 and 5, the battery unit 42 is depicted. The battery unit 42 includes a battery 50, a battery case 51, a negative contact segment 53 as first contact segment, and a positive contact segment 52 as second contact segment. In the battery 50, a negative battery electrode 50a is disposed at a first end face. A positive battery electrode 50b is disposed at faces including a cylindrical surface and a second end face. In the present embodiment, the battery 50 is an alkali battery of the AAA type.

The battery case 51 has a size approximately equal to that of a battery of the AA type, and is constituted by a case body 54 and an elastic cap 55 as elastic member. The case body 54 is transparent, and formed from non-conductive resin or insulation material, and has a cylindrical shape. An end opening 54a is formed in one end of the case body 54, and is closed by the elastic cap 55 in a watertight manner.

Figure 6:
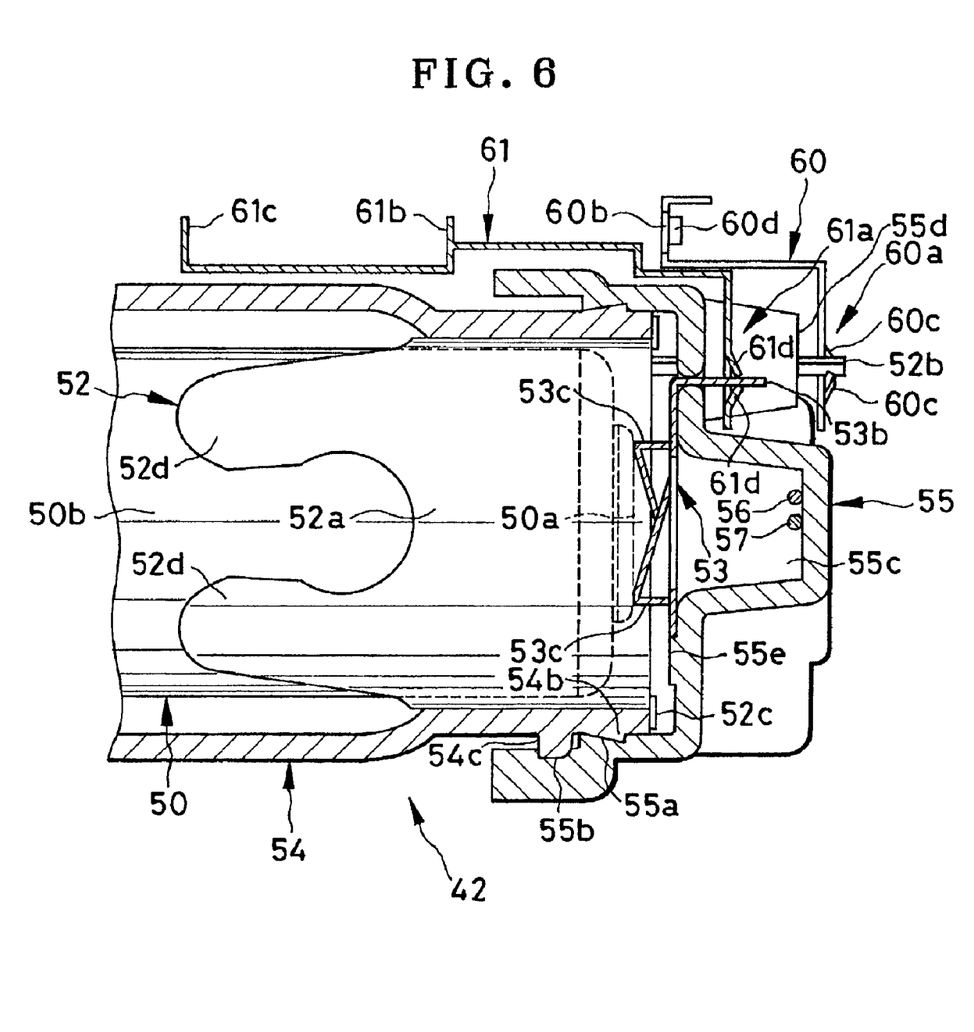
FIG. 6 is a horizontal section, partially cutaway, illustrating the battery unit.

The elastic cap 55 is formed from elastomer and is flexible with elasticity. In FIG. 6, retention grooves 55a and 55b are formed in the inner wall of the elastic cap 55. Also, retention projections 54b and 54c are formed to project from the case body 54. When the elastic cap 55 is secured to the case body 54, the retention projection 54b is engaged with the retention groove 55a to cover the end opening 54a in a watertight manner. The elastic cap 55 is kept secured to the case body 54 without dropping by retention of the retention projection 54c on the retention groove 55b.

A containing chamber 55c is formed at the center of the elastic cap 55. Hydrogenation catalyst 56 is contained in the containing chamber 55c. An example of the hydrogenation catalyst 56 is palladium catalyst, which causes reaction of hydrogen gas and oxygen gas to produce water. Hydrogen gas, if created from the battery 50, is caused to react on oxygen gas in the atmosphere to produce water. This is effective in preventing accidental ignition at the time of occurrence of sparks in contact regions between the battery 50 and the positive contact segment 52 or the negative contact segment 53. Also, water absorbing agent 57, such as silica gel, is contained in the vicinity of the hydrogenation catalyst 56. Vapor of water produced by the hydrogenating reaction is eliminated by water absorption of the water absorbing agent 57. This is effective in preventing the battery 50 from corrosion due to vapor of water. Note that the reason of locating the containing chamber 55c on the negative side of the battery 50 is that hydrogen gas is created on the negative side because of a retreating shape of metal material in the battery 50 toward the projecting portion of the positive electrode. The position of the containing chamber 55c is effective in efficient reaction of hydrogen gas on the oxygen gas.

Figure 7:
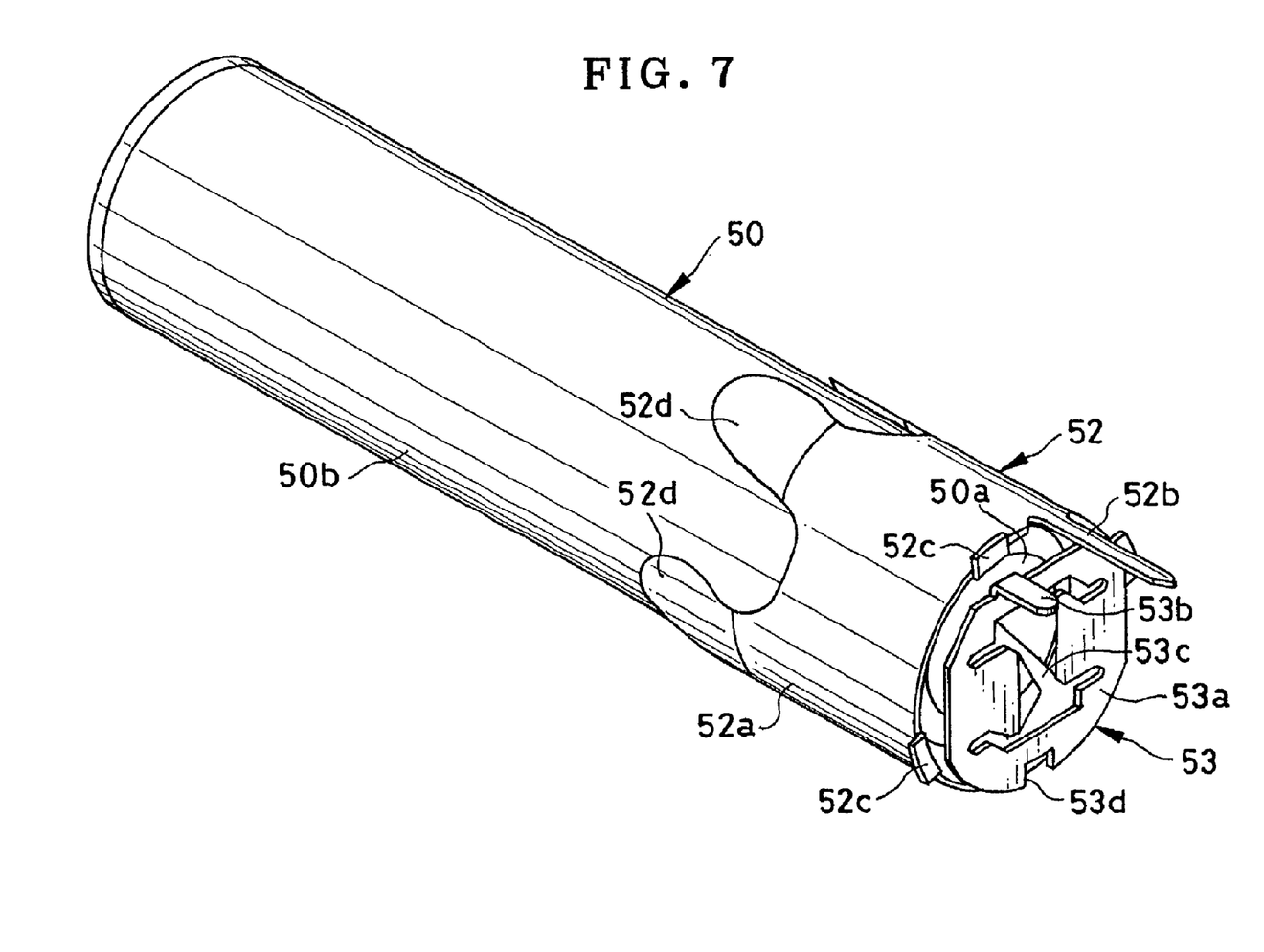
FIG. 7 is a perspective illustrating the battery and the positive and negative contact segments.

In FIG. 7, the positive and negative contact segments 52 and 53 are formed by bending a metal plate. The positive contact segment 52 includes a segment body 52a, a terminal pin 52b and brackets 52c. Plural plate portions 52d are provided on the segment body 52a, and contact the positive battery electrode 50b of the battery 50. On an end face 54d of the case body 54, the brackets 52c are fitted when the positive contact segment 52 is secured to the case body 54. The terminal pin 52b projects from the contour of the segment body 52a. A projecting portion 55d having a receiving chamber is included in the elastic cap 55, is thrust with the terminal pin 52b, of which a distal end comes out of the elastic cap 55.

The negative contact segment 53 includes a segment body 53a and a terminal pin 53b. A pair of plate portions 53c extend from the segment body 53a and are opposed to the negative battery electrode 50a of the battery 50. The plate portions 53c, as viewed in cross section, have a V shape, and when contacted by the battery 50, are deformed resiliently to contact the negative battery electrode 50a firmly. A positioning notch 53d is formed in an end of the segment body 53a. A positioning projection 55e projects from an inner face of the elastic cap 55, and is engaged with the positioning notch 53d to position the negative contact segment 53. The terminal pin 53b projects from the contour of the segment body 53a. An electrode target portion 55f of the elastic cap 55 is penetrated by the terminal pin 53b, which emerges on an outer side of the elastic cap 55.

The positive contact segment 52 is connected with a positive pole connector 60 outside the elastic cap 55. The negative contact segment 53 is connected with a negative pole connector 61. Each of the positive and negative pole connectors 60 and 61 is formed by bending a metal plate, and is connected to the flash circuit board 40.

The positive pole connector 60 includes a contact arm 60a and an engagement portion 60b. Two contact flaps 60c are formed in the contact arm 60a. The terminal pin 52b is forcibly inserted in a gap between the contact flaps 60c. The contact flaps 60c are deformed resiliently in a direction of advancing the terminal pin 52b, and also push the terminal pin 52b with resiliency. An engagement hole 40d is formed in the flash circuit board 40. The engagement portion 60b has an end with such a small width so as to be engaged with the engagement hole 40d. A retention portion 60d is formed with a lateral face of the engagement portion 60b. When the engagement portion 60b is inserted in the engagement hole 40d, the retention portion 60d is captured by the engagement hole 40d so as to keep the positive pole connector 60 from moving in a back-to-front direction parallel with the optical axis.

The negative pole connector 61 includes a contact arm 61a and two pins 61b and 61c. The contact arm 61a has a shape similar to the contact arm 60a of the positive pole connector 60. When the terminal pin 53b is pushed into the contact arm 61a, a pair of contact flaps 61d contact the terminal pin 53b with resiliency. Engagement holes 40e and 40f are formed in the flash circuit board 40. The pins 61b and 61c have a tapered shape with a decreasing width so as to facilitate insertion into the engagement holes 40e and 40f.

The operation of assembling the battery unit 42 is described now. At first, the positive contact segment 52 is mounted on the case body 54. Then the battery 50 is inserted in the case body 54. The plate portions 52d contact the positive battery electrode 50b, so the positive contact segment 52 is connected with the positive battery electrode 50b of the battery 50. After this, the hydrogenation catalyst 56 and the water absorbing agent 57 are placed in the containing chamber 55c in the elastic cap 55. The terminal pin 53b of the negative contact segment 53 is thrust through the electrode target portion 55f of the elastic cap 55. Thus, the negative contact segment 53 is secured to the elastic cap 55. Also, the terminal pin 52b of the positive contact segment 52 is thrust through the projecting portion 55d of the elastic cap 55. At the same time, the elastic cap 55 is fitted on the case body 54. As the plate portions 53c contact the negative battery electrode 50a, the negative contact segment 53 becomes connected with the negative battery electrode 50a of the battery 50.

Then the positive and negative pole connectors 60 and 61 are assembled on to the battery unit 42 being obtained. In the positive pole connector 60, the engagement portion 60b is secured to the engagement hole 40d of the flash circuit board 40. In the negative pole connector 61, the pins 61b and 61c are secured to the engagement holes 40e and 40f. All of those are fixed on the printed circuit pattern by soldering. Thus, the battery 50 inside the battery case 51 supplies the flash circuit with electric power. In order to secure the flash unit 34 to the main body 30, the flash circuit board 40 is positioned at the hook or claw 30a of the main body 30. The battery case 51 is placed between the holder plates 30b in a squeezed manner.

An outer size of the battery case 51 is approximately equal to that of the AA type of battery. The battery unit 42 can be inserted suitably in a flash unit in a conventional type of lens-fitted photo film unit. It is possible to prevent leakage of solution from the battery in the lens-fitted photo film unit, and also to reuse the battery unit 42 in a manner similar to the flash unit. The battery 50 can be removed from the battery case 51. Thus, the battery case 51 can be reused. The battery 50 can be discarded in a separate manner after being used. According to the embodiment, the terminal pins 52b and 53b penetrate through the elastic cap 55. It is unnecessary to form holes previously in the elastic cap 55 for insertion of terminal pins of the positive and negative contact segments 52 and 53. A manufacturing cost for the lens-fitted photo film unit can be reduced, because the assembling operation can be simplified.

As the battery case 51 is fixedly held in the main body 30, no soldering is required for the terminal pins 52b and 53b of the positive and negative contact segments 52 and 53 to the positive and negative pole connectors 60 and 61. Operation for assembling those is facilitated. Due to the holding of the battery case 51 in the main body 30, no extreme strength is required in securing the positive and negative pole connectors 60 and 61 to the flash circuit board 40. An area of securing the positive and negative pole connectors 60 and 61 to the flash circuit board 40 can be smaller than an area where those would be secured to the flash circuit board 40 according to the prior art. Consequently, the flash unit can have a smaller size than those known in the art. As the positive and negative contact segments 52 and 53 are disposed at one end of the battery case 51, it is possible to avoid using a terminal arm of a great length on the side of the flash circuit board 40. This is effective in reducing the manufacturing cost of parts, and raising suitability of parts for assembling operation.

The waterproof lens-fitted photo film unit 10 after taking exposures is forwarded to a photo laboratory. For photofinishing operation, at first the waterproof case 12 is removed from the lens-fitted photo film unit 11. Even if water has permeated into the lens-fitted photo film unit 11 due to breakage or damages in the waterproof case 12, no water reaches the battery 50, and no corrosion occurs, because the battery 50 is protected inside the battery case 51. If leakage of solution occurs in the battery 50, the battery case 51 contains the battery 50 so as to prevent the leaking solution of strong alkali from reaching the lens-fitted photo film unit 11. This enables an operator to handle the lens-fitted photo film unit 11 for photofinishing without touching the harmful solution of the strong alkali after removing the lens-fitted photo film unit 11 from the waterproof case 12.

In the above embodiment, the battery unit 42 is disposed under the flash circuit board 40. However, the battery unit 42 may be disposed on a right, left or upper side of the flash circuit board 40. In the above embodiment, the battery 50 is an alkali battery. However, the battery 50 may be a manganese dry battery or the like. In the above embodiment, the positive contact segment 52 contacts the cylindrical surface as the positive battery electrode 50b of the battery 50. Alternatively, the positive contact segment 52 may have a shape to contact an end face of the battery 50 as the positive battery electrode 50b in an opposite position to the negative battery electrode 50a.

Also, it is possible to form a space in the battery case 51 for reserving leaked solution from the battery 50 in addition to the space for the battery 50. Furthermore, neutralizing agent may be contained in the battery case 51 for neutralizing reaction upon the leaked solution of strong alkali from the battery 50. Examples of neutralizing agents are boric acid, para tri-salt sulfonic acid, and the like. Should an operator touch the solution leaked from the battery 50, his or her hand will not suffer burns from the alkali, because the alkali has been neutralized effectively.

Furthermore, a coloring member or coloring material layer may be provided on the outer face of the battery case 51 by operation of coating or mixture. Such coloring member of coloring material layer can include coloring material, of which an example is litmus solution. If electrolyte or solution of strong alkali is leaked from the battery 50, the coloring material develops a predetermined conspicuous color such as vivid blue or other primary color, to inform an operator of occurrence of the leakage of the solution from the battery case 51.

In the above embodiment, the lens-fitted photo film unit 11 includes a flash unit. However, the lens-fitted photo film unit 11 may be a type without flash, and also may be a general-use type without a waterproof structure.

Figure 8:
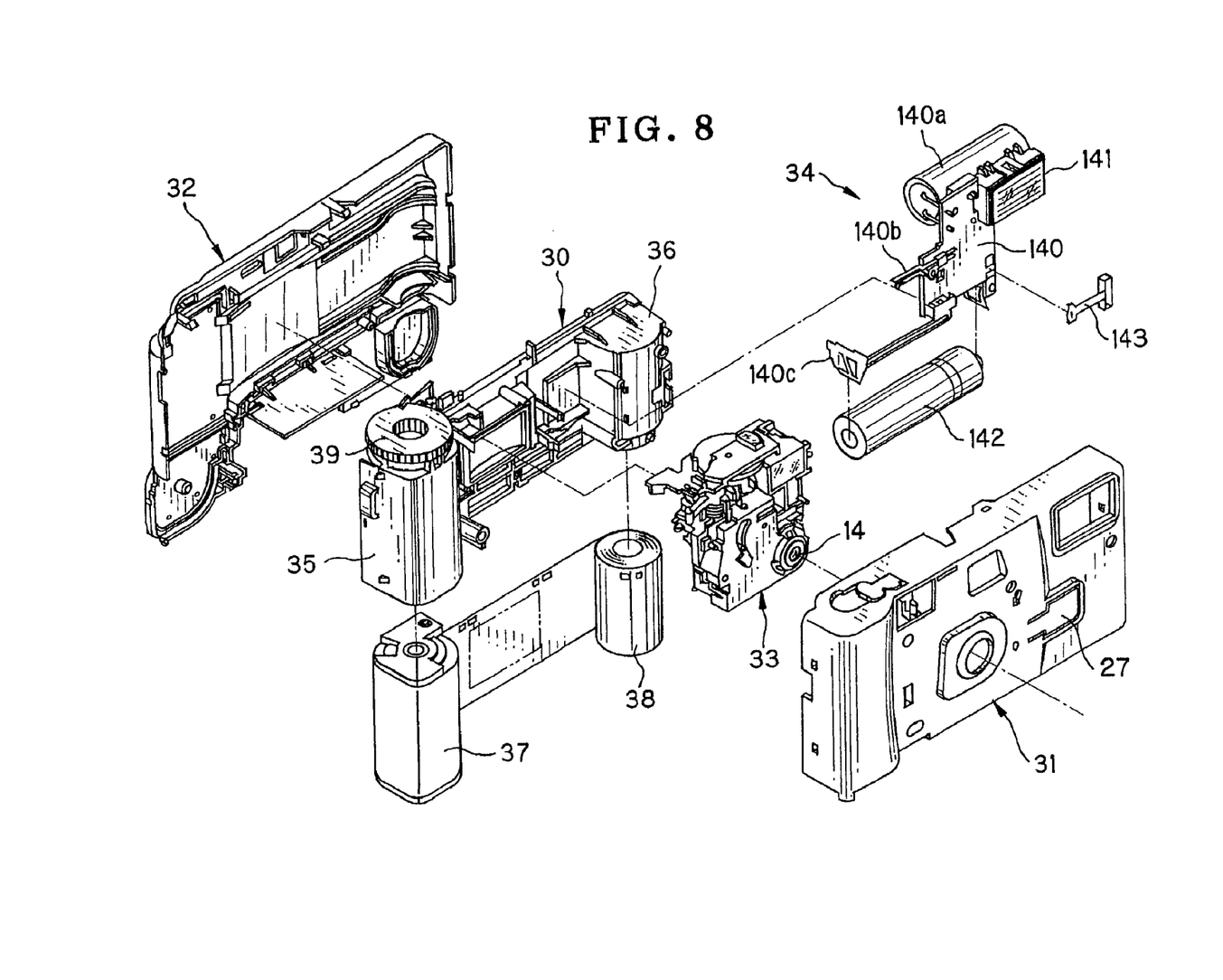
FIG. 8 is an exploded perspective illustrating another preferred lens-fitted photo film unit.

Another preferred embodiment is now described with reference to FIGS. 8–12, in which a battery unit has a simple structure. In FIG. 8, a switch segment 143 is secured to the rear of the inner flash button 27. A flash circuit board 140 has a pair of contact points. When the flash button 17 is depressed, the switch segment 143 contacts the contact points and connects to one another. The flash circuit is turned on. A main capacitor 140a is charged. When a sync switch 140b is turned on by actuation of the shutter mechanism, the main capacitor 140a is discharged. A flash emitter 141 emits flash light. A terminal arm 140c extends from the flash circuit board 140. A battery unit 142 is held by the terminal arm 140c, which connects the battery unit 142 to the flash circuit board 140 electrically.

Figure 9:
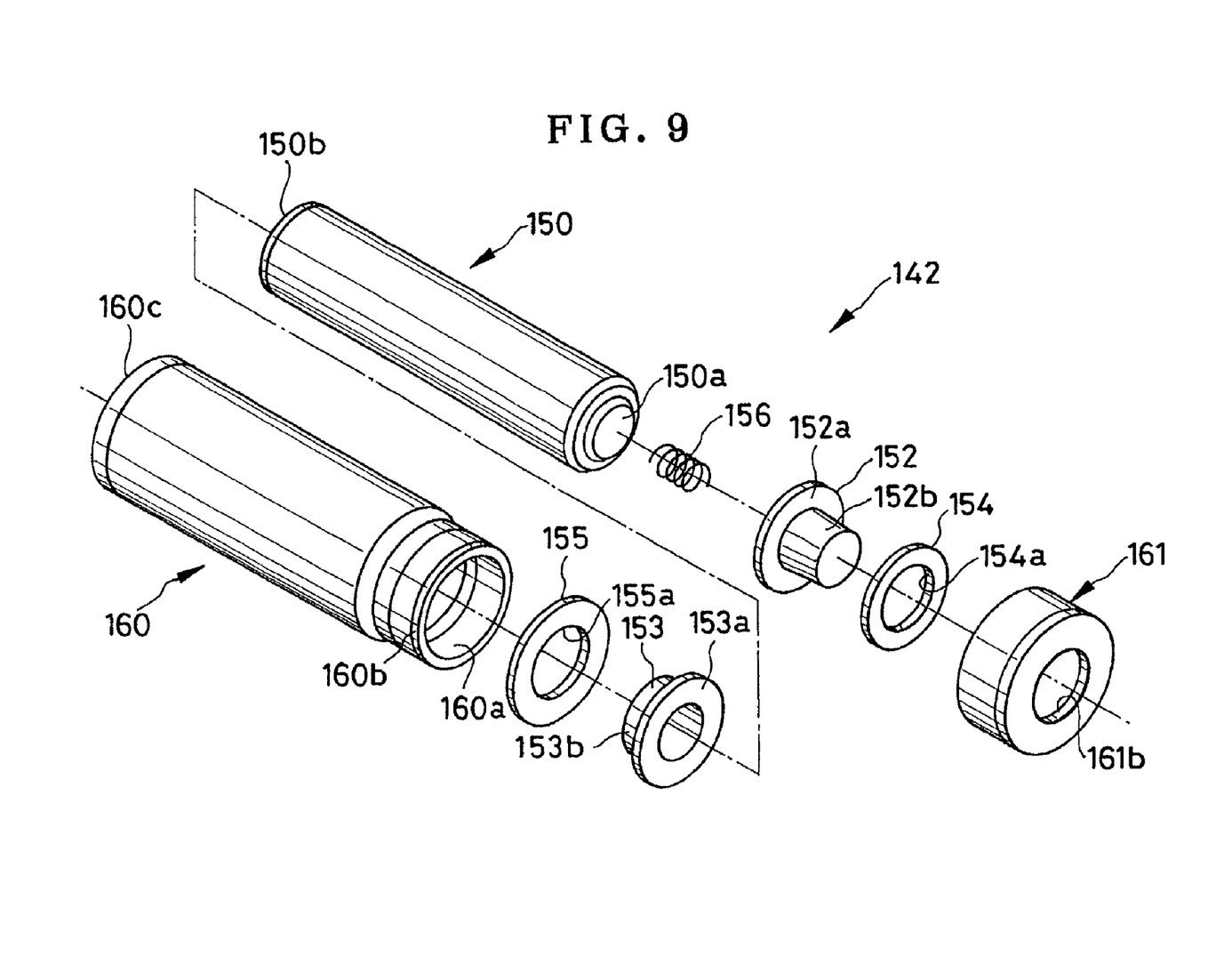
FIG. 9 is an exploded perspective illustrating a battery unit.
Figure 10:
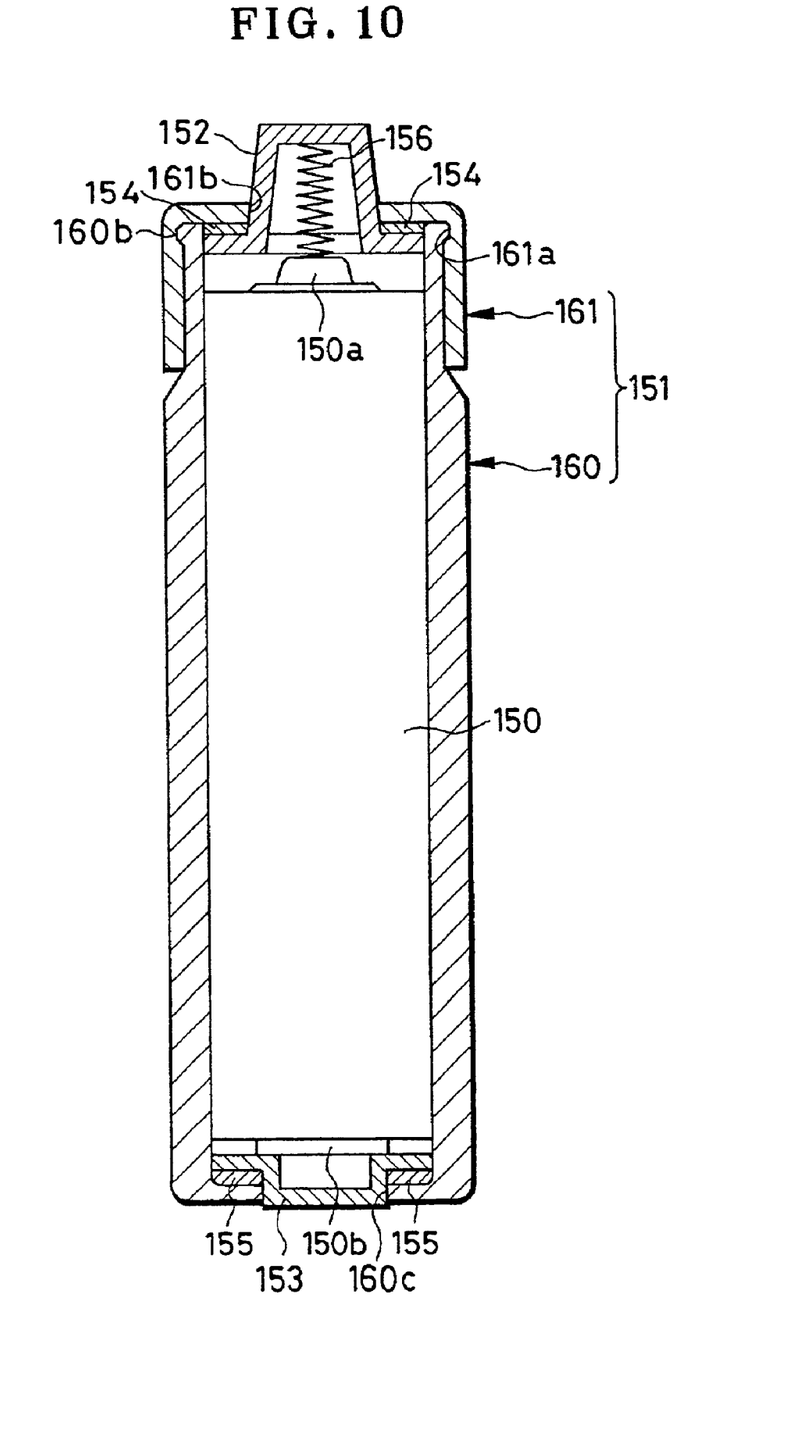
FIG. 10 is a horizontal section illustrating the battery unit.

In FIGS. 9 and 10, the battery unit 142 is illustrated. In FIG. 9, the battery unit 142 includes a battery 150, a battery case 151, a positive contact segment 152, a negative contact segment 153, packing members 154 and 155 and a coil spring 156 as biasing mechanism. The battery 150 includes a positive battery electrode 150a at a first end face, and a negative battery electrode 150b at a second end face. In the present embodiment, the battery 150 is an alkali battery of the AAA type.

A case body 160 has a through hole 160c, in which the negative contact segment 153 extends to the outside. A cap 161 has a through hole 161b, in which the positive contact segment 152 extends to the outside.

The positive and negative contact segments 152 and 153 are respectively formed from metal. An end opening 160a at an end of the case body 160 has a diameter nearly equal to the positive contact segment 152 or the negative contact segment 153. The positive contact segment 152 includes a plate portion 152a and a terminal projection 152b. The plate portion 152a contacts the positive battery electrode 150a of the battery 150 electrically. Also, the terminal projection 152b emerges through the through hole 161b in the cap 161, and constitutes a positive electrode of the battery unit 142.

The negative contact segment 153 includes a ring-shaped plate portion 153a and a terminal projection 153b. The ring-shaped plate portion 153a contacts the negative battery electrode 150b of the battery 150 electrically. The terminal projection 153b is inserted in the through hole 160c in the case body 160, and constitute a negative electrode of the battery unit 142.

The packing member 154 is disposed between the positive contact segment 152 and the cap 161. The packing member 155 is disposed between the negative contact segment 153 and the case body 160. The packing members 154 and 155 have a diameter substantially equal to that of the end opening 160a, and are contained in the battery case 151. Openings 154a and 155a are formed in respectively the packing members 154 and 155. The terminal projections 152b and 153b are inserted in the openings 154a and 155a. The packing members 154 and 155 contact the plate portions 152a and 153a.

The coil spring 156 is disposed between the battery 150 and the positive contact segment 152. The coil spring 156 biases the battery 150 toward the negative electrode, and biases the positive contact segment 152 in a direction to extend from the battery case 151. The battery 150 pushes the negative contact segment 153 and the packing member 155 in the longitudinal direction of the battery case 151. Also, the positive contact segment 152 pushes the packing member 154. As the battery case 151 is fastened firmly, the inside of the battery unit 142 is kept airtight and watertight. The coil spring 156 connects the positive battery electrode 150a electrically to the positive contact segment 152, and also keeps the negative battery electrode 150b connected to the negative contact segment 153.

Operation of the battery unit for being contained in the lens-fitted photo film unit is described now. Elements are inserted into the case body 160, in an order of the packing member 155, the negative contact segment 153, the battery 150, the coil spring 156, the positive contact segment 152 and the packing member 154.

A retention groove 161a is formed in the cap 161, which is fixedly retained by engagement of a retention ridge 160b with the retention groove 161a. The positive and negative contact segments 152 and 153 partially come out of the battery case 151. Thus, the cap 161 is prevented from dropping. The coil spring 156 biases the battery 150 and the positive contact segment 152, so the negative contact segment 153 and the packing members 154 and 155 are pushed in the battery longitudinal direction, to close the gap inside the through holes 160c and 161b in an airtight manner. It is possible by use of the cap 161 and the packing members 154 and 155 to prevent water from entry into the inside of the battery case 151.

The battery unit 142 being thus manufactured is held by the terminal arm 140c of the flash unit 34, and connected electrically with the flash unit 34. The flash unit 34 with the main body 30 is covered by the front cover 31 and the rear cover 32, to obtain the lens-fitted photo film unit 11. The lens-fitted photo film unit 11 is enclosed in the waterproof case 12 to obtain the waterproof lens-fitted photo film unit 10. As the waterproof case 12 is watertight, the waterproof lens-fitted photo film unit 10 can be used underwater for taking exposures.

Figure 11:
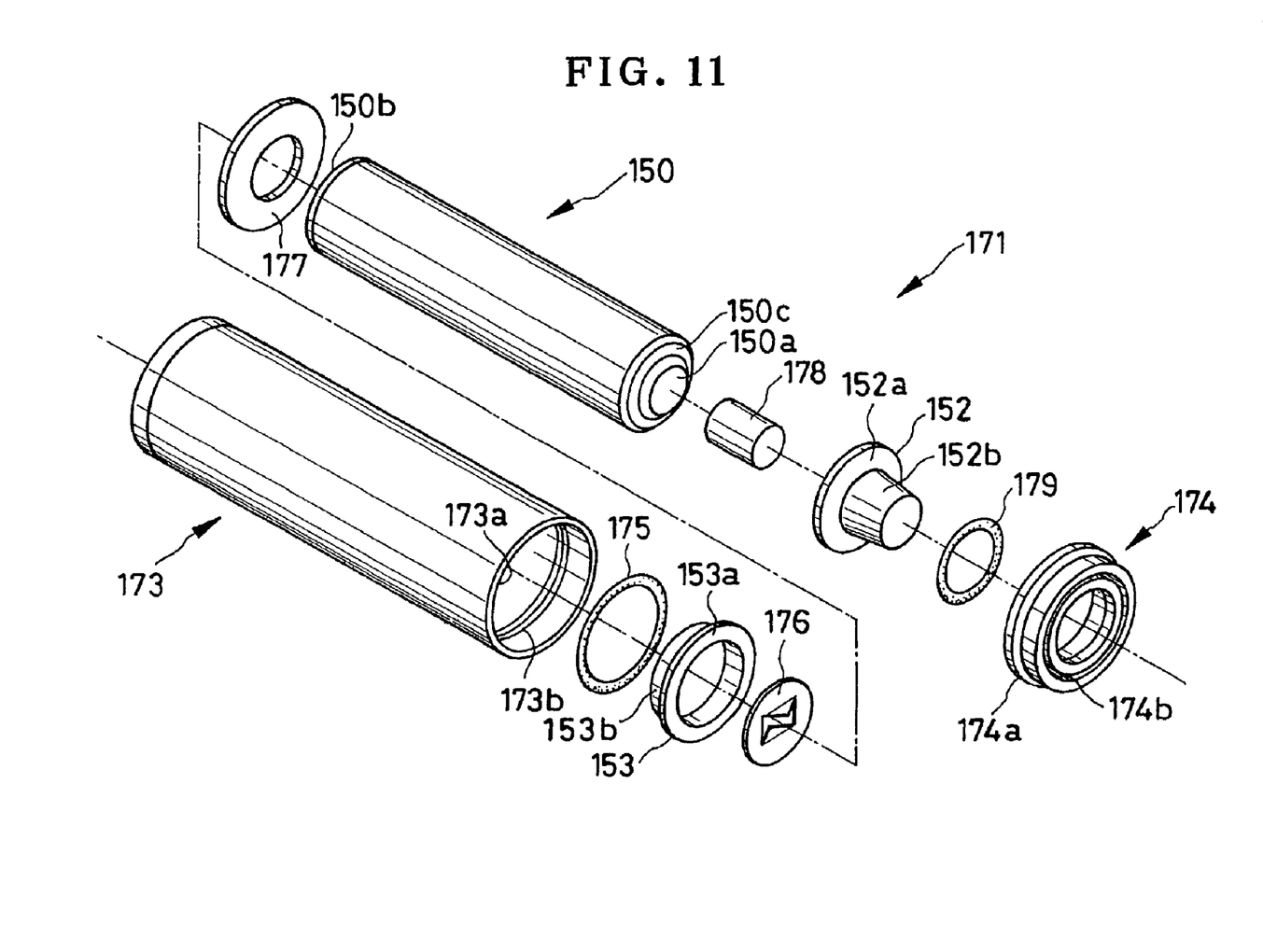
FIG. 11 is an exploded perspective illustrating another preferred battery unit.
Figure 12:
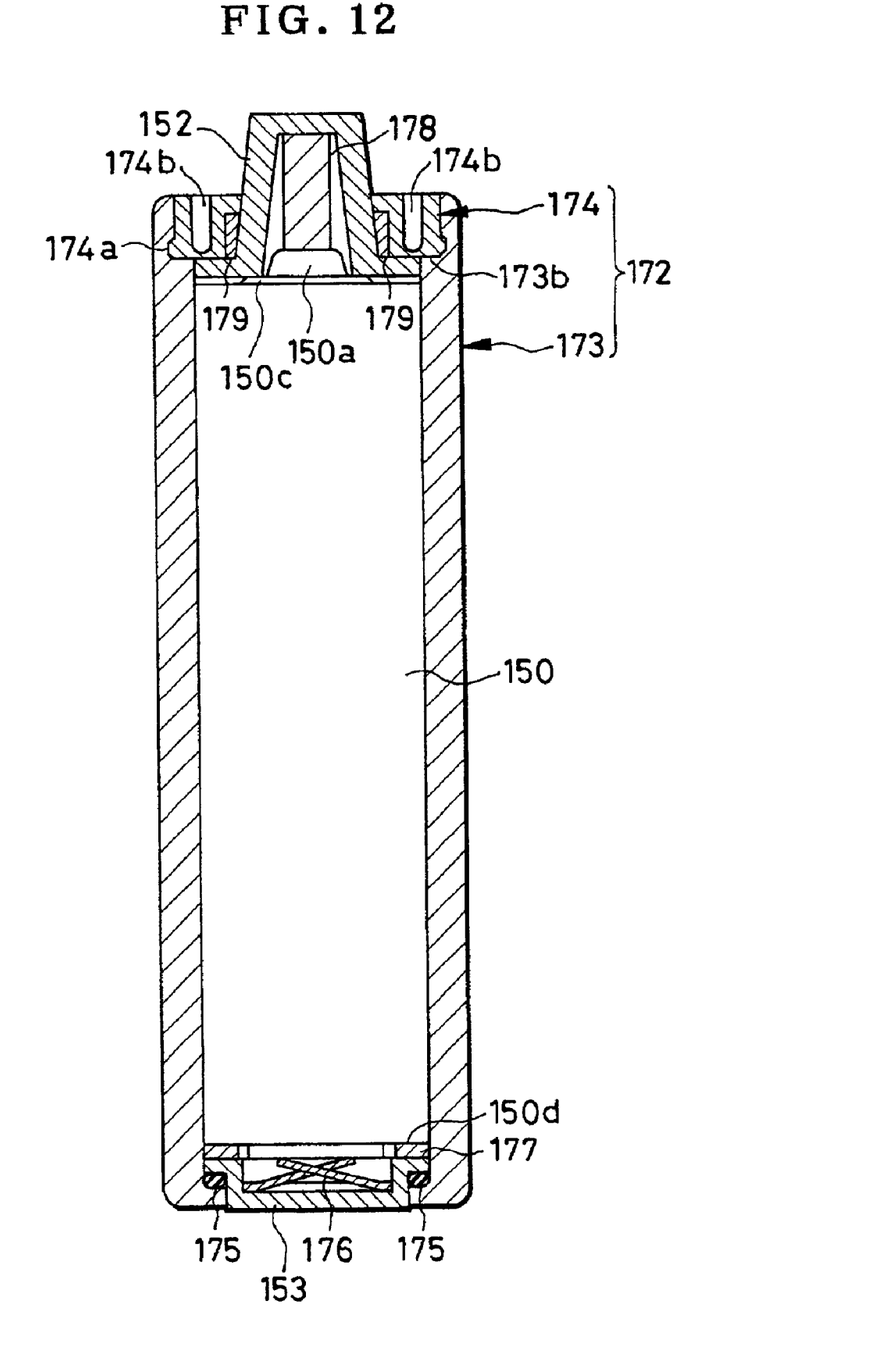
FIG. 12 is a horizontal section illustrating the battery unit.

In the above embodiment, an outer wall of the case body 160 is engaged with an inner wall of a flange of the cap 161 so as to keep the battery unit 142 watertight. Alternatively, an inner wall of the case body 160 may be engaged with an outer wall of the cap 161. Furthermore, other elements may be accommodated in the battery case 151. Another preferred battery unit 171 is illustrated in FIGS. 11 and 12. Elements similar to those of the above embodiment are designated with identical reference numerals. A battery case 172 includes a case body 173 and a cap 174. Elements are placed in the battery case 172, including an O-ring 175 as packing member, the negative contact segment 153, a plate spring 176 of metal as biasing mechanism, an insulation spacer 177, the battery 150, the positive contact segment 152 and an O-ring 179 as packing member, in an order toward the positive electrode. Hydrogenation catalyst 178 is provided in a gap inside the positive contact segment 152. An end opening 173a is formed in the case body 173. A groove 173b is formed in an inner wall of the case body 173 near to the end opening 173a. A cap edge 174a of the cap 174 is engaged with the groove 173b.

The cap 174 has a slightly larger size than an inner diameter of the end opening 173a. A circular groove 174b is formed in the cap 174 to reduce the plastic material in the cap 174, and to facilitate flexing. The cap 174 is readily inserted in and removed from the end opening 173a by flexing at the circular groove 174b. When the flexing of the cap 174 is discontinued, the cap 174 recovers its original shape, to fit the cap edge 174a with the groove 173b.

The plate spring 176 is similar to the above-described coil spring 156, and biases the battery 150 and the positive contact segment 152 in the longitudinal direction of the battery case 172. Lateral faces of the positive and negative contact segments 152 and 153 push the O-rings 175 and 179, so the inside of the battery unit 171 can be kept airtight and watertight. As the plate spring 176 contacts the negative battery electrode 150b and the negative contact segment 153, the plate spring 176 connects the negative battery electrode 150b with the negative contact segment 153. A peripheral portion 150c of the positive battery electrode 150a is engaged with the positive contact segment 152, and connected to the same electrically. An outer portion 150d is included in the battery 150. The insulation spacer 177 is used for insulation of the outer portion 150d of the battery 150 from the negative contact segment 153.

An example of the hydrogenation catalyst 178 is palladium catalyst, which causes reaction of hydrogen gas and oxygen gas to produce water. In the present embodiment, the hydrogenation catalyst 178 is constituted by palladium catalyst and support material of γ-alumina. The hydrogenation catalyst 178 promotes chemical reaction between the hydrogen gas and oxygen gas, but is not changed itself chemically at the time of the reaction. To provide the hydrogenation catalyst 178, hydrogen gas, if created from the battery 150, is caused to react on oxygen in the atmosphere to produce water, so as to eliminate the hydrogen gas. No hydrogen gas remains in the battery 150. Safety in using the battery 150 can be ensured. Note that it is preferable to contain water absorbing agent in the battery case 172 together with the hydrogenation catalyst 178. Other examples of the hydrogenation catalyst 178 include those of which a main component are platinum, ruthenium and rhodium.

According to the above embodiment, the battery unit for a lens-fitted photo film unit contains the AAA type of battery. However, a battery of the N type (UM-5 type) may be also used. Furthermore, the lens-fitted photo film unit 11 may be a general-use type without a waterproof structure. This is effective in protecting the battery from water typically at the time of rainfall or the like. In the above embodiments, the battery unit is oriented horizontally to set its longitudinal direction equal to that of the main body. However the battery unit may be oriented vertically in parallel with the axis of the roll of the photo film.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A battery unit for being contained in a lens-fitted photo film unit, comprising:
    a battery including first and second battery electrodes;
    a battery case, formed from insulating material, for containing said battery, the battery case comprising an elastic member;
    first and second through holes formed in the elastic member of said battery case; and
    first and second contact segments, inserted through respectively said first and second through holes in a watertight manner, for contacting respectively said first and second battery electrodes, for external connection of said battery, wherein an interior surface of each of the through holes in the elastic member makes contact with only a respective one of the contact segments.

2. A battery unit as defined in claim 1, wherein said battery is an AAA type, and said battery case substantially has a size of an AA type of battery.

3. A battery unit as defined in claim 2, wherein each of said first and second contact segments includes:
    a plate portion for contacting said first or second battery electrode; and
    a terminal pin, formed to protrude from said plate portion, for being thrust through said elastic member in said watertight manner.

4. A battery unit as defined in claim 3, wherein said battery is shaped cylindrically, and has first and second end faces and a cylindrical face;
    said first battery electrode is disposed at said first end face, and said second battery electrode is disposed at said second end face and said cylindrical face.

5. A battery unit as defined in claim 4, wherein said battery case includes a case body, having one end wall, and an end opening disposed opposite to said end wall, for containing said battery;
    said elastic member is a cap for closing said end opening in said watertight manner.

6. A battery unit as defined in claim 5, wherein said plate portion of said second contact segment is curved, and has an inner face for contacting said cylindrical face of said battery.

7. A battery unit as defined in claim 6, wherein said cap is formed from rubber or elastomer.

8. A battery unit as defined in claim 6, wherein said cap includes:
    a projecting portion, formed to project from a cap outer face in a position of said terminal pin of said first or second contact segment; and
    a receiving chamber, formed to retreat from a cap inner face in a position reverse to said projecting portion, for receiving said terminal pin, to allow thrusting of said terminal pin through said projecting portion.

9. A battery unit as defined in claim 8, further comprising:
    a positioning cutout formed in said plate portion of said first contact segment; and
    a positioning projection, formed to project from said cap, for engagement with said positioning cutout to position said first contact segment.

10. A battery unit as defined in claim 9, further comprising:
    a retention groove formed in one of said cap and said case body; and
    a retention projection, formed to project from a remaining one of said cap and said case body, for engagement with said retention groove, to retain said cap on said case body in said watertight manner.

11. A battery unit as defined in claim 1, further comprising a containing chamber, formed inside said cap, for containing at least one of neutralizing agent, hydrogenation catalyst and water absorbing agent.

12. A battery unit as defined in claim 1, further comprising neutralizing agent, accommodated in said battery case, for neutralizing alkali solution from said battery being damaged.

13. A battery unit as defined in claim 1, further comprising hydrogenation catalyst, accommodated in said battery case, for causing hydrogen from said battery to react upon oxygen if said battery is damaged.

14. A battery unit as defined in claim 13, further comprising water absorbing agent, accommodated in said battery case, for absorbing water produced according to said hydrogenation catalyst.

15. A battery unit as defined in claim 1, further comprising a coloring member or coloring material layer, including coloring material, applied to or secured to an outer surface of said battery case, for developing color by reaction upon alkali solution from said battery being damaged, to indicate occurrence of a damage.

16. A battery unit as defined in claim 1, further comprising at least one biasing mechanism, disposed between said first contact segment and said first battery electrode, or between said second contact segment and said second battery electrode, for pushing said first or second contact segment to keep said first or second contact segment fitted tightly in said first or second through hole.

17. A battery unit as defined in claim 16, wherein said battery is shaped cylindrically, and said first and second battery electrodes are disposed at first and second end faces of said battery;

said battery case includes a case body and a cap, said case body having one end wall, and an end opening disposed opposite to said end wall, for containing said battery, said cap closing said end opening in said watertight manner;

said first and second through holes are formed in respectively said cap and said end wall.

18. A battery unit as defined in claim 17, further comprising first and second packing members for preventing water from entry between said first contact segment and said first through hole, and between said second contact segment and said second through hole.

19. A battery unit as defined in claim 18, wherein each of said first and second contact segments includes:

a plate portion disposed between an inner face of said cap or said end wall and said first or second battery electrodes; and a terminal projection, formed to project from said plate portion and inserted in said first or second through hole.

20. A battery unit as defined in claim 19, wherein said first packing member is disposed between said plate portion of said first contact segment and said cap, and said second packing member is disposed between said plate portion of said second contact segment and said end wall.

21. A battery unit as defined in claim 20, wherein said at least one biasing mechanism includes a coil spring.

22. A battery unit as defined in claim 20, wherein said at least one biasing mechanism includes a plate spring.

23. A battery unit as defined in claim 20, wherein said cap includes:

a disk-shaped cap body; and a flange portion, formed to project from a periphery of said cap body toward said end wall, for being fitted on an outer surface of said case body about said end opening.

24. A battery unit as defined in claim 20, wherein said cap is inserted in said end opening to be fitted.

25. The battery unit of claim 1, wherein only a distal end of each of the first and second contact segments lies outside the battery case.

26. The battery unit of claim 3, wherein for each of the first and second contact segments, only a distal end of each terminal pin opposite the plate portion of the contact segment lies outside the battery case.

27. A battery unit for being contained in a lens-fitted photo film unit, comprising:

a battery including first and second battery electrodes;

a battery case, formed from insulating material, for containing said battery, the battery case comprising an end wall and an end opening disposed opposite the end wall, the battery case further comprising an elastic member in the form of a cap constructed so as to be able to close the end opening in a watertight manner;

first and second through holes formed in said battery case;

first and second contact segments, inserted through respectively said first and second through holes in a watertight manner, for contacting respectively said first and second battery electrodes, for external connection of said battery;

a plate portion for contacting said first or second battery electrode;

a positioning cutout formed in said plate portion of said first contact segment; and a positioning projection, formed to project from said cap, for engagement with said positioning cutout to position said first contact segment.

28. A battery unit for being contained in a lens-fitted photo film unit, comprising:

a battery including first and second battery electrodes;

a battery case, formed from insulating material, for containing said battery;

first and second through holes formed in said battery case; and first and second contact segments, inserted through respectively said first and second through holes in a watertight manner, for contacting respectively said first and second battery electrodes, for external connection of said battery;

first and second packing members for preventing water from entry between said first contact segment and said first through hole, and between said second contact segment and said second through hole.

* * * * *